United States Patent
Mishra et al.

(10) Patent No.: US 12,348,409 B2
(45) Date of Patent: Jul. 1, 2025

(54) MULTICAST MTRACE EXTENSION TO TRACE ANY-SOURCE MULTICAST (ASM) SOURCE

(71) Applicant: Cisco Technology, Inc., San Jose, CA (US)

(72) Inventors: Mankamana Prasad Mishra, San Jose, CA (US); Anuj Budhiraja, San Jose, CA (US); Sridhar Santhanam, Dublin, CA (US); Sunil Krishnan K, Kannur (IN)

(73) Assignee: CISCO TECHNOLOGY, INC., San Jose, CA (US)

( * ) Notice: Subject to any disclaimer, the term of this patent is extended or adjusted under 35 U.S.C. 154(b) by 444 days.

(21) Appl. No.: 17/810,060

(22) Filed: Jun. 30, 2022

(65) Prior Publication Data

US 2024/0007390 A1  Jan. 4, 2024

(51) Int. Cl.
*H04L 45/16* (2022.01)
*H04L 45/00* (2022.01)
*H04L 45/02* (2022.01)

(52) U.S. Cl.
CPC .............. *H04L 45/16* (2013.01); *H04L 45/02* (2013.01); *H04L 45/26* (2013.01)

(58) Field of Classification Search
CPC .......... H04L 45/16; H04L 45/02; H04L 45/26
USPC ....................................................... 370/256
See application file for complete search history.

(56) References Cited

U.S. PATENT DOCUMENTS

| | | | |
|---|---|---|---|
| 9,674,075 | B1 | 6/2017 | Nagarajan et al. |
| 2012/0033667 | A1 | 2/2012 | Venkataraman et al. |
| 2012/0051231 | A1* | 3/2012 | Ou ........................ H04L 12/18 370/248 |
| 2012/0120954 | A1 | 5/2012 | Mentze et al. |
| 2016/0277199 | A1* | 9/2016 | Nagarajan ............. H04L 12/185 |
| 2017/0093589 | A1 | 3/2017 | Asthana et al. |
| 2020/0220742 | A1 | 7/2020 | Zhang |
| 2020/0344155 | A1 | 10/2020 | Chhibber et al. |

FOREIGN PATENT DOCUMENTS

CN        101789900 A        7/2010

OTHER PUBLICATIONS

Mtrace command, IBM Documentation, "https://www.ibm.com/docs/fr/aix/7.2?topic=m-mtrace-command", Jul. 17, 2023.*
Multicastcommands, ip infusion, "https://docs.ipinfusion.com/service-provider/index.html#page/OcNOS-SP/Mcast-CR/Multicast_Commands.html".*
Asaeda et al., Mtrace Version 2: Traceroute Facility for IP Multicast, 69th IETF, Jul. 2007, Chicago, slides 1-14, "chrome-extension://efaidnbmnnnibpcajpcglclefindmkaj/https://www.ietf.org/proceedings/69/slides/mboned-3.pdf".*

(Continued)

*Primary Examiner* — Anthony Mejia
(74) *Attorney, Agent, or Firm* — Baker Botts L.L.P.

(57) ABSTRACT

In one embodiment, a method by a router in a multicast network for multicast mtrace extension to trace one or more any-source multicast (ASM) sources includes transmitting a mtrace (*,G) route to a last hop router, receiving an active source list, and creating a mtrace (S,G) route for a rendezvous point (RP) to initiate based on the received active source list.

17 Claims, 3 Drawing Sheets

(56) References Cited

OTHER PUBLICATIONS

"What does mtrace really do?", Cisco, "https://learningnetwork.cisco.com/s/question/0D53i00000Kt0B6CAJ/what-does-mtrace-really-do", Feb. 16, 2020.*
"What is the purpose of the mtrace command?", Cisco, "https://community.cisco.com/t5/switching/what-is-the-purpose-of-the-mtrace-command/td-p/1558709", Sep. 17, 2010.*
International Search Report and Written Opinion for International Application No. PCT/US2023/025727, mailed Sep. 21, 2023, 13 Pages.

* cited by examiner

MULTICAST MTRACE EXTENSION TO TRACE ANY-SOURCE MULTICAST (ASM) SOURCE

TECHNICAL FIELD

The present disclosure relates generally to a field of wide area networks, and more particularly, to a multicast mtrace extension to trace one or more any-source multicast (ASM) sources.

BACKGROUND

Multicast techniques allow for sending data to a group of interested receivers. Multicast techniques may make efficient use of network infrastructure, for example, by requiring the source to send a packet only once, even if the packet needs to be delivered to a large number of receivers. Nodes in the network, such as switches and routers, may replicate the packet so that the packet reaches each interested receiver.

DESCRIPTION OF EXAMPLE EMBODIMENTS

Overview

In particular embodiments, a router in a multicast network may comprise one or more processors and one or more computer-readable non-transitory storage media coupled to one or more of the processors. The one or more computer-readable non-transitory storage media may comprise instructions operable when executed by one or more of the processors to cause the router to transmit a mtrace (*,G) route to a last hop router. The processors may be operable when executing the instructions to receive an active source list. The processors may be operable when executing the instructions to create a mtrace (S,G) route for a rendezvous point (RP) to initiate based on the received active source list.

In particular embodiments, a method, by a router, for multicast mtrace extension to trace one or more any-source multicast (ASM) sources may comprise transmitting a mtrace (*,G) route to a last hop router. The method may further comprise receiving an active source list. The method may further comprise creating a mtrace (S,G) route for a rendezvous point (RP) to initiate based on the received active source list.

In particular embodiments, one or more computer-readable non-transitory storage media may embody software that is operable on a router when executed to transmit a mtrace (*,G) route to a last hop router. The software may be operable when executed to receive an active source list. The software may be operable when executed to create a mtrace (S,G) route for a rendezvous point (RP) to initiate based on the received active source list.

EXAMPLE EMBODIMENTS

Figure 1:
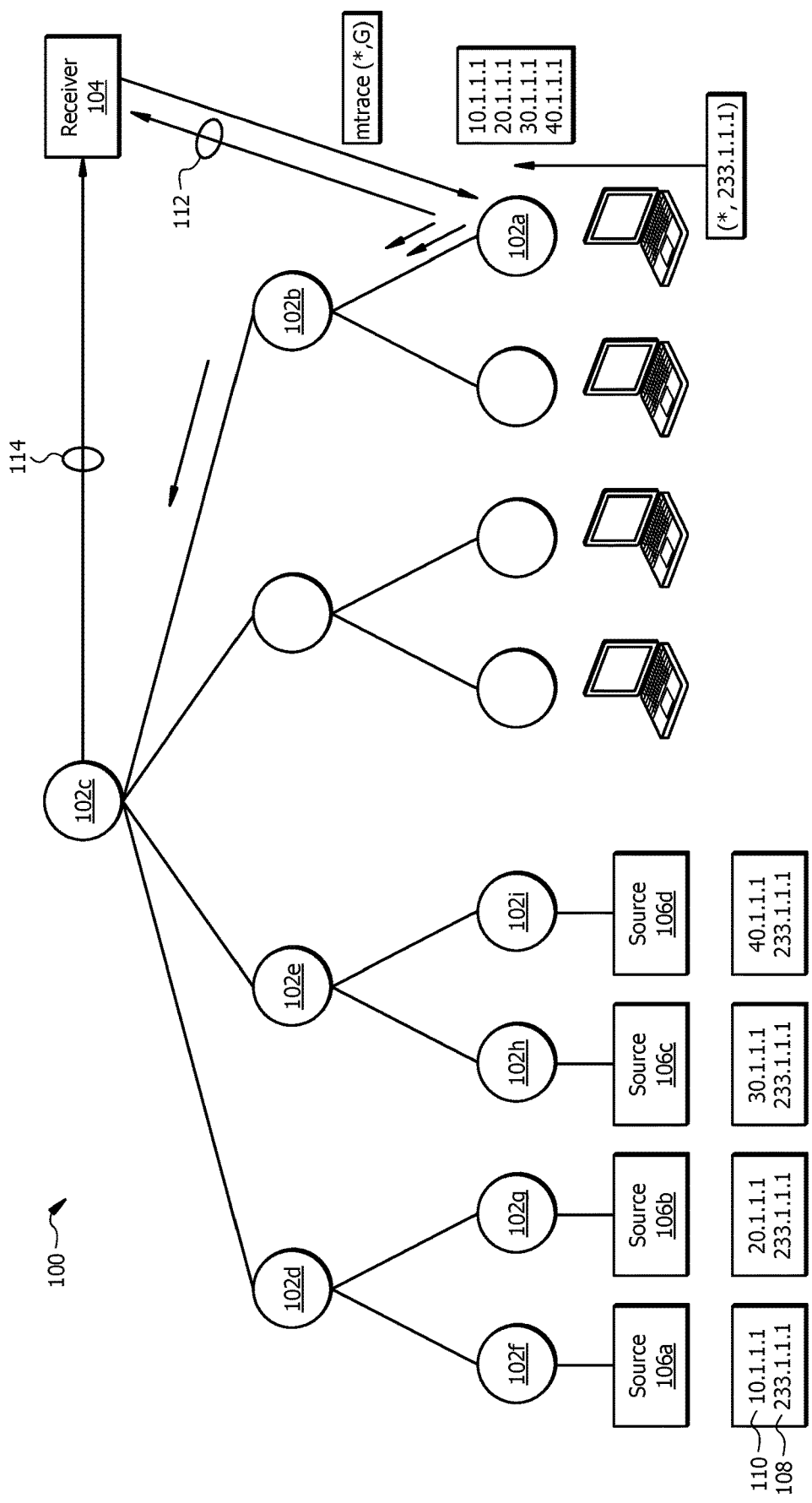
FIG. 1 illustrates an example multicast network.
Figure 2:
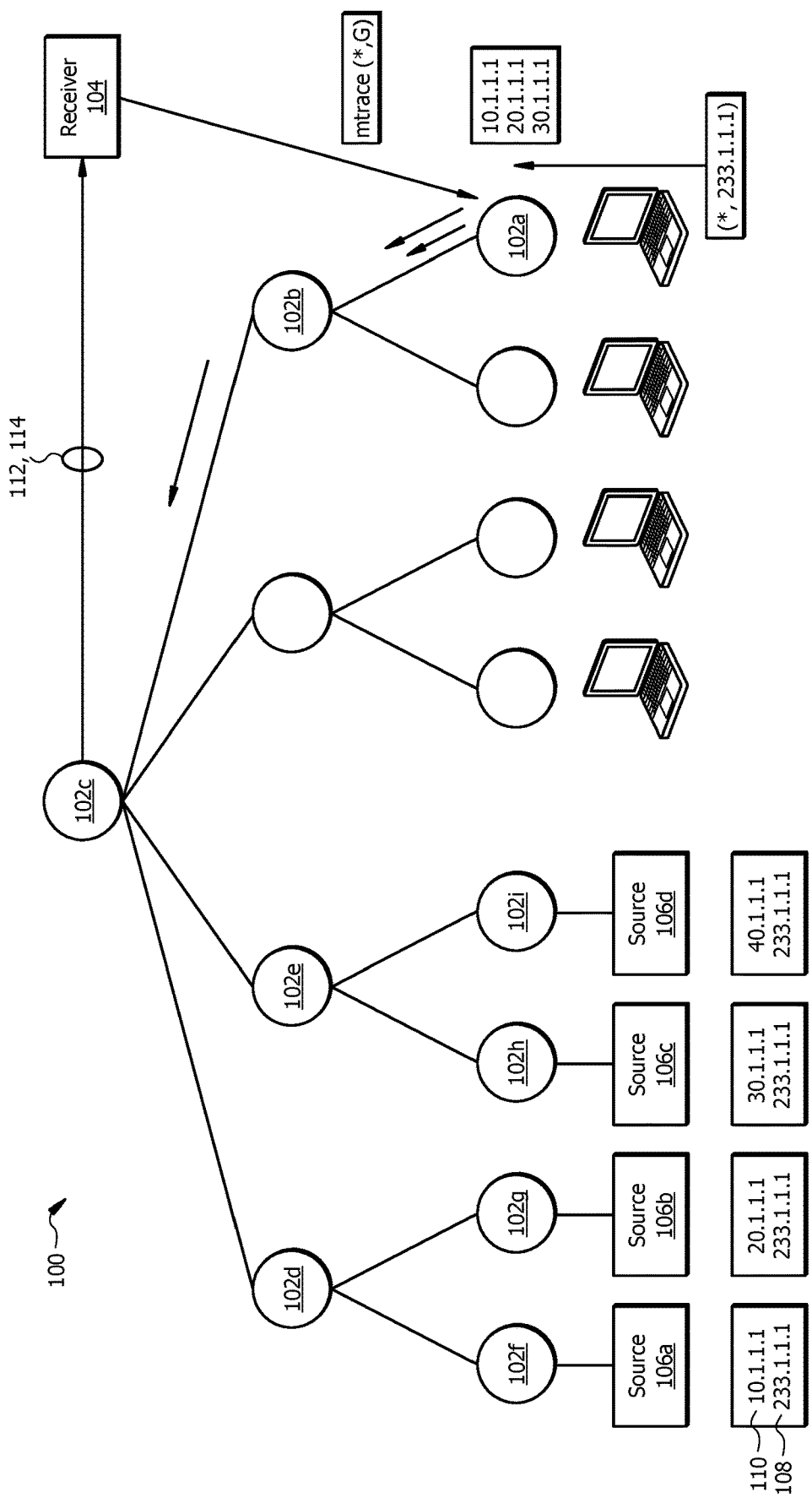
FIG. 2 illustrates an example multicast network.

FIGS. 1-2 illustrate an example of a network 100 that provides Internet Protocol (IP) multicast to trace one or more any-source multicast (ASM) sources. In particular embodiments, the network 100 may be a software-defined wide-area network (SD-WAN). Network 100 may include multiple routers 102 (e.g., 102a-102i), one or more receivers 104, and one or more sources 106 (e.g., 106a-106d). The physical topology for network 100 may be a cloud (representing the WAN) with all routers 102 connecting to the cloud. For purposes of example and explanation, FIGS. 1-2 show certain connections between certain components (such as connections between certain routers 102). However, FIGS. 1-2 do not imply a particular physical topology as the connections may be made via the cloud.

In general, network 100 may be an underlay network that supports a virtual overlay network. An underlay network may include, for example, all or a portion of: the Internet, one or more IP networks (such as one or more IP Security, IPsec, networks), one or more Multiprotocol Label Switching (MPLS) networks, one or more cellular network(s), and/or other suitable networks. In certain embodiments, the virtual overlay network may include data plane connections/tunnels that carry traffic between components of the network 100. As an example, the virtual overlay network may include IP Security (IPsec) tunnels that carry traffic between components of the network 100. In certain embodiments, the virtual overlay network may carry traffic between a plurality of sites over the underlay network. Each site may connect to the network via one or more WAN-edge routers.

In certain embodiments, one of the sources 106 may include any suitable endpoint that originates a multicast stream. Examples of source 106 may include user devices, such as a desktop computer system, a laptop or notebook computer system, a mobile telephone, a personal digital assistant (PDA), a tablet computer system, an augmented/virtual reality device, etc. Additional examples of source 106 may include servers, mainframes, data centers, cloud platforms, or any other computer system capable of transmitting a multicast stream. As another example, the source 106 could be a video camera that provides video data to be multicast to receiver 104 via routers 102a-102i. Routers 102f-102i may each be configured as an FHR that receives the multicast stream from each of sources 106a-106d, respectively, and communicates the multicast stream into network 100. In embodiments, routers 102f-102i of network 100 may communicate the multicast stream from sources 106a-106d to a rendezvous point (RP) (for example, router 102c). The RP of typical networks acts as a meeting place for sources and receivers of the multicast stream. For example, routers 102f-102i may register sources 106a-106d with a RP such that sources 106a-106d send multicast streams to the RP to be forwarded to receiver 104. Router 102a may be configured as a last hop router (LHR) that serves receiver 104. Examples of receiver 104 may include user devices, such as a desktop computer system, a laptop or notebook computer system, an interactive kiosk, a mobile telephone, a personal digital assistant (PDA), a tablet computer system, an augmented/virtual reality device, etc. Additional examples of receiver 104 may include servers, mainframes, data centers, cloud platforms, or any other computer system capable of receiving a multicast stream.

In particular embodiments, the source 106 may direct a multicast stream to a group address 108, but the group address 108 may not directly indicate where to forward data packets of the multicast stream. As such, a multicast tree may be generated to determine a path between each source 106 and one or more receivers 104. Multicast trees may be initiated by a receiver 104 signaling a request to join a group receptive of data from each source 106. In embodiments, a path may be generated from the receiver 104 to the any one of sources 106a-106d hob-by-hop via routers 102a-102i using a source address 110. Once the path of a multicast tree is generated from the receiver 104 to any one of sources 106a-106d, the source traffic from that source 106 may flow to the receiver 104. In embodiments, traffic may flow through a source tree or a shared tree. For example, in a shared tree, multicast traffic may be rooted anywhere, such as through a * root, for example, in the case of a (*, G) stream. In a source tree, multicast traffic may be rooted through an S root, for example, in the case of an (S, G) stream. In both cases, the G represents multiple receivers that may receive the multicast stream. The S indicates that the multicast stream is to be received from a particular source (i.e., source 106), such as an IP address of a particular video camera. The * is a wildcard indicating that the multicast stream may be received from any source.

In embodiments where one or more sources 106 are unknown to the receiver 104, a shared multicast distribution tree may be generated using a (*, G) stream broadcast by the sources 106. The receiver 104 may transmit a multicast mtrace extension, such as a (*,G) route, to trace one or more ASM sources (for example, sources 106a-106d). The multicast mtrace extension may be received by a RP in the network 100, such as router 102c, wherein the RP transmits a reply message to the receiver 104 that traces the route from receiver 104 to the RP. The present disclosure may provide systems and methods operable to detect the remainder of the route from the RP to the source 106.

In embodiments, the receiver 104 (i.e., a multicast client) may transmit a multicast mtrace (*,G) route to the LHR router 102a. As the router 102a receives the mtrace (*,G) route from receiver 104, the router 102a may previously or concurrently receive multicast traffic from the RP router 102c. Router 102a may determine the source addresses 110 of one or more sources 106 sending the multicast traffic. As shown in FIG. 1, the router 102a may transmit an active source list 112 comprising the source addresses 110 of one or more sources 106 operable to transmit multicast traffic to the receiver 104. The router 102a may further transmit the mtrace (*,G) route to router 102b, which is then forwarded to RP router 102c. Upon receiving the mtrace (*,G) route, the RP router 102c may transmit a response signal 114 to the receiver 104 indicating the determined route from receiver 104 to RP router 102c. Once receiver 104 receives the response signal 114, the receiver 104 may transmit a mtrace (S,G) route to one of the sources 106 determined from the active source list 112.

In particular embodiments, the network 100 may comprise additional sources 106 not illustrated. In these embodiments, the RP router 102c may not deliver multicast traffic from each one of the sources 106 to the router 102a, and the router 102a may not transmit an accurate active source list 112. As shown in FIG. 2, instead of router 102a transmitting active source list 112, the RP router 102c may transmit the active source list 112 to the receiver 104 in addition to the response signal 114. In this example, the RP router 102c may receive multicast traffic from each source 106 and the router 102a may not receive multicast traffic from each source 106. Similar to FIG. 1, the receiver 104 may transmit a mtrace (S,G) route to one of the sources 106 determined from the active source list 112 once receiver 104 receives the response signal 114 and active source list 112. In one or more embodiments, the mtrace (S,G) route may be generated to initiate from RP router 102c to the determined source 106.

Although this disclosure describes network 100 in a particular manner, this disclosure contemplates any network as network 100 in any suitable manner. For example, for simplicity, FIGS. 1-2 show certain communication paths between routers 102a-102i. However, additional communication paths may exist between various routers 102a-102i. Furthermore, in certain embodiments, the network may include other routers 102a-102i (which may be configured as FHRs, RPs, or LHRs, for example), and one or more of routers 102a-102i may communicate with one or more of the other routers. Moreover, network 100 may include any other suitable components, such as a controller in a control plane that may provision, maintain, and/or secure the overlay network and/or a manager in a management/orchestration plane.

Figure 3:
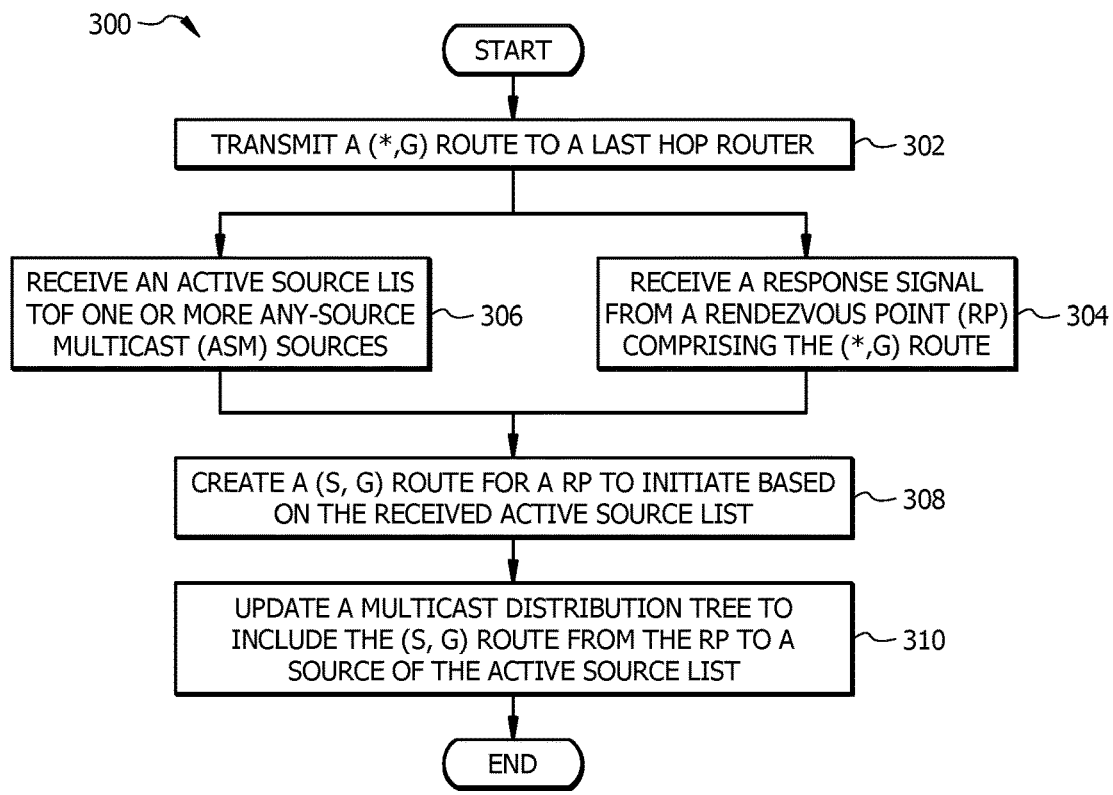
FIG. 3 illustrates an example method for multicast mtrace extension to trace one or more ASM sources.

FIG. 3 illustrates an example method 300 for multicast mtrace extension to trace one or more ASM sources. In embodiments, method 300 may include generating a multicast distribution tree from a last hop router to a source. The method 300 may begin at step 302, where the receiver 104 (referring to FIGS. 1-2) may transmit a mtrace (*,G) route to a last hop router, such as router 102a (referring to FIGS. 1-2). The method may proceed to step 304 and step 306, wherein both steps 304, 306 may occur concurrently or soon after each other. In embodiments, the method 300 may not proceed until both steps 304, 306 are satisfied. At step 304, the RP router 102c (referring to FIGS. 1-2) may transmit the response signal 114 (referring to FIGS. 1-2) to receiver 104, wherein the response signal 114 comprises the mtrace (*,G) route originating from receiver 104. At step 304, the receiver 104 receives the response signal 114. In embodiments, the router 102a may forward the mtrace (*,G) route to router 102b (referring to FIGS. 1-2), which may forward the mtrace (*,G) route to RP router 102c. During step 304, the receiver 104 may generate a portion of the multicast distribution tree, and the portion includes a route from the receiver 104 to the RP router 102c. At step 306, the receiver 104 may receive the active source list 112 (referring to FIGS. 1-2) that includes the source addresses 110 (referring to FIGS. 1-2) of one or more sources 106 (referring to FIGS. 1-2) to transmit multicast traffic to the receiver 104. In embodiments, the receiver 104 may receive the active source list 112 from the router 102a and/or the RP router 102c.

At step 308, the receiver 104 may generate a mtrace (S,G) route for a determined source 106 within the received active source list 112. The mtrace (S,G) route may be generated to initiate from RP router 102c to that determined source 106. At step 310, the receiver 104 may update the generated multicast distribution tree to include a remaining portion, and the remaining portion includes the mtrace (S,G) route from the RP router 102c to the source 106. The method 300 may then proceed to end.

Particular embodiments may repeat one or more steps of the method of FIG. 3, where appropriate. Although this disclosure describes and illustrates particular steps of the method of FIG. 3 as occurring in a particular order, this disclosure contemplates any suitable steps of the method of FIG. 3 occurring in any suitable order. Moreover, although this disclosure describes and illustrates an example method for multicast mtrace extension to trace one or more ASM sources including the particular steps of the method of FIG. 3, this disclosure contemplates any suitable method for multicast mtrace extension to trace one or more ASM sources including any suitable steps, which may include all, some, or none of the steps of the method of FIG. 3, where appropriate. Furthermore, although this disclosure describes and illustrates particular components, devices, or systems carrying out particular steps of the method of FIG. 3, this disclosure contemplates any suitable combination of any suitable components, devices, or systems carrying out any suitable steps of the method of FIG. 3.

Figure 4:
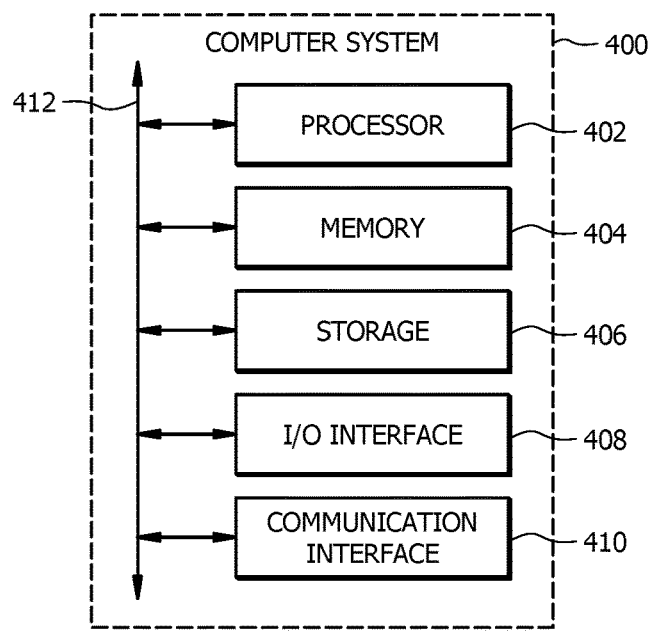
FIG. 4 illustrates an example computer system.

FIG. 4 illustrates an example computer system 400. In particular embodiments, one or more computer systems 400 perform one or more steps of one or more methods described or illustrated herein. In particular embodiments, one or more computer systems 400 provide functionality described or illustrated herein. In particular embodiments, software running on one or more computer systems 400 performs one or more steps of one or more methods described or illustrated herein or provides functionality described or illustrated herein. Particular embodiments include one or more portions of one or more computer systems 400. Herein, reference to a computer system may encompass a computing device, and vice versa, where appropriate. Moreover, reference to a computer system may encompass one or more computer systems, where appropriate. Further, each one of routers 102, receiver 104, and sources 106 in FIG. 1 may be any suitable computer system, such as the illustrated computer system 400.

This disclosure contemplates any suitable number of computer systems 400. This disclosure contemplates computer system 400 taking any suitable physical form. As example and not by way of limitation, computer system 400 may be an embedded computer system, a system-on-chip (SOC), a single-board computer system (SBC) (such as, for example, a computer-on-module (COM) or system-on-module (SOM)), a desktop computer system, a laptop or notebook computer system, an interactive kiosk, a mainframe, a mesh of computer systems, a mobile telephone, a personal digital assistant (PDA), a server, a tablet computer system, an augmented/virtual reality device, or a combination of two or more of these. Where appropriate, computer system 400 may include one or more computer systems 400; be unitary or distributed; span multiple locations; span multiple machines; span multiple data centers; or reside in a cloud, which may include one or more cloud components in one or more networks. Where appropriate, one or more computer systems 400 may perform without substantial spatial or temporal limitation one or more steps of one or more methods described or illustrated herein. As an example and not by way of limitation, one or more computer systems 400 may perform in real time or in batch mode one or more steps of one or more methods described or illustrated herein. One or more computer systems 400 may perform at different times or at different locations one or more steps of one or more methods described or illustrated herein, where appropriate.

In particular embodiments, computer system 400 includes a processor 402, memory 404, storage 406, an input/output (I/O) interface 408, a communication interface 410, and a bus 412. Although this disclosure describes and illustrates a particular computer system having a particular number of particular components in a particular arrangement, this disclosure contemplates any suitable computer system having any suitable number of any suitable components in any suitable arrangement.

In particular embodiments, processor 402 includes hardware for executing instructions, such as those making up a computer program. As an example and not by way of limitation, to execute instructions, processor 402 may retrieve (or fetch) the instructions from an internal register, an internal cache, memory 404, or storage 406; decode and execute them; and then write one or more results to an internal register, an internal cache, memory 404, or storage 406. In particular embodiments, processor 402 may include one or more internal caches for data, instructions, or addresses. This disclosure contemplates processor 402 including any suitable number of any suitable internal caches, where appropriate. As an example and not by way of limitation, processor 402 may include one or more instruction caches, one or more data caches, and one or more translation lookaside buffers (TLBs). Instructions in the instruction caches may be copies of instructions in memory 404 or storage 406, and the instruction caches may speed up retrieval of those instructions by processor 402. Data in the data caches may be copies of data in memory 404 or storage 406 for instructions executing at processor 402 to operate on; the results of previous instructions executed at processor 402 for access by subsequent instructions executing at processor 402 or for writing to memory 404 or storage 406; or other suitable data. The data caches may speed up read or write operations by processor 402. The TLBs may speed up virtual-address translation for processor 402. In particular embodiments, processor 402 may include one or more internal registers for data, instructions, or addresses. This disclosure contemplates processor 402 including any suitable number of any suitable internal registers, where appropriate. Where appropriate, processor 402 may include one or more arithmetic logic units (ALUs); be a multi-core processor; or include one or more processors 402. Although this disclosure describes and illustrates a particular processor, this disclosure contemplates any suitable processor.

In particular embodiments, memory 404 includes main memory for storing instructions for processor 402 to execute or data for processor 402 to operate on. As an example and not by way of limitation, computer system 400 may load instructions from storage 406 or another source (such as, for example, another computer system 400) to memory 404. Processor 402 may then load the instructions from memory 404 to an internal register or internal cache. To execute the instructions, processor 402 may retrieve the instructions from the internal register or internal cache and decode them. During or after execution of the instructions, processor 402 may write one or more results (which may be intermediate or final results) to the internal register or internal cache. Processor 402 may then write one or more of those results to memory 404. In particular embodiments, processor 402 executes only instructions in one or more internal registers or internal caches or in memory 404 (as opposed to storage 406 or elsewhere) and operates only on data in one or more internal registers or internal caches or in memory 404 (as opposed to storage 406 or elsewhere). One or more memory buses (which may each include an address bus and a data bus) may couple processor 402 to memory 404. Bus 412 may include one or more memory buses, as described below. In particular embodiments, one or more memory management units (MMUs) reside between processor 402 and memory 404 and facilitate accesses to memory 404 requested by processor 402. In particular embodiments, memory 404 includes random access memory (RAM). This RAM may be volatile memory, where appropriate. Where appropriate, this RAM may be dynamic RAM (DRAM) or static RAM (SRAM). Moreover, where appropriate, this RAM may be single-ported or multi-ported RAM. This disclosure contemplates any suitable RAM. Memory 404 may include one or more memories 404, where appropriate. Although this disclosure describes and illustrates particular memory, this disclosure contemplates any suitable memory.

In particular embodiments, storage 406 includes mass storage for data or instructions. As an example and not by way of limitation, storage 406 may include a hard disk drive (HDD), a floppy disk drive, flash memory, an optical disc, a magneto-optical disc, magnetic tape, or a Universal Serial Bus (USB) drive or a combination of two or more of these. Storage 406 may include removable or non-removable (or fixed) media, where appropriate. Storage 406 may be internal or external to computer system 400, where appropriate. In particular embodiments, storage 406 is non-volatile, solid-state memory. In particular embodiments, storage 406 includes read-only memory (ROM). Where appropriate, this ROM may be mask-programmed ROM, programmable ROM (PROM), erasable PROM (EPROM), electrically erasable PROM (EEPROM), electrically alterable ROM (EAROM), or flash memory or a combination of two or more of these. This disclosure contemplates mass storage 406 taking any suitable physical form. Storage 406 may include one or more storage control units facilitating communication between processor 402 and storage 406, where appropriate. Where appropriate, storage 406 may include one or more storages 406. Although this disclosure describes and illustrates particular storage, this disclosure contemplates any suitable storage.

In particular embodiments, I/O interface 408 includes hardware, software, or both, providing one or more interfaces for communication between computer system 400 and one or more I/O devices. Computer system 400 may include one or more of these I/O devices, where appropriate. One or more of these I/O devices may enable communication between a person and computer system 400. As an example and not by way of limitation, an I/O device may include a keyboard, keypad, microphone, monitor, mouse, printer, scanner, speaker, still camera, stylus, tablet, touch screen, trackball, video camera, another suitable I/O device or a combination of two or more of these. An I/O device may include one or more sensors. This disclosure contemplates any suitable I/O devices and any suitable I/O interfaces 408 for them. Where appropriate, I/O interface 408 may include one or more device or software drivers enabling processor 402 to drive one or more of these I/O devices. I/O interface 408 may include one or more I/O interfaces 408, where appropriate. Although this disclosure describes and illustrates a particular I/O interface, this disclosure contemplates any suitable I/O interface.

In particular embodiments, communication interface 410 includes hardware, software, or both providing one or more interfaces for communication (such as, for example, packet-based communication) between computer system 400 and one or more other computer systems 400 or one or more networks. As an example and not by way of limitation, communication interface 410 may include a network interface controller (NIC) or network adapter for communicating with an Ethernet or other wire-based network or a wireless NIC (WNIC) or wireless adapter for communicating with a wireless network, such as a WI-FI network. This disclosure contemplates any suitable network and any suitable communication interface 410 for it. As an example and not by way of limitation, computer system 400 may communicate with an ad hoc network, a personal area network (PAN), a local area network (LAN), a wide area network (WAN), a metropolitan area network (MAN), or one or more portions of the Internet or a combination of two or more of these. One or more portions of one or more of these networks may be wired or wireless. As an example, computer system 400 may communicate with a wireless PAN (WPAN) (such as, for example, a BLUETOOTH WPAN), a WI-FI network, a WI-MAX network, a cellular telephone network (such as, for example, a Global System for Mobile Communications (GSM) network, a Long-Term Evolution (LTE) network, or a 5G network), or other suitable wireless network or a combination of two or more of these. Computer system 400 may include any suitable communication interface 410 for any of these networks, where appropriate. Communication interface 410 may include one or more communication interfaces 410, where appropriate. Although this disclosure describes and illustrates a particular communication interface, this disclosure contemplates any suitable communication interface.

In particular embodiments, bus 412 includes hardware, software, or both coupling components of computer system 400 to each other. As an example and not by way of limitation, bus 412 may include an Accelerated Graphics Port (AGP) or other graphics bus, an Enhanced Industry Standard Architecture (EISA) bus, a front-side bus (FSB), a HYPERTRANSPORT (HT) interconnect, an Industry Standard Architecture (ISA) bus, an INFINIBAND interconnect, a low-pin-count (LPC) bus, a memory bus, a Micro Channel Architecture (MCA) bus, a Peripheral Component Interconnect (PCI) bus, a PCI-Express (PCIe) bus, a serial advanced technology attachment (SATA) bus, a Video Electronics Standards Association local (VLB) bus, or another suitable bus or a combination of two or more of these. Bus 412 may include one or more buses 412, where appropriate. Although this disclosure describes and illustrates a particular bus, this disclosure contemplates any suitable bus or interconnect.

Herein, a computer-readable non-transitory storage medium (or media) or a non-transitory computer-readable medium may include one or more semiconductor-based or other integrated circuits (ICs) (such, as for example, field-programmable gate arrays (FPGAs) or application-specific ICs (ASICs)), hard disk drives (HDDs), hybrid hard drives (HHDs), optical discs, optical disc drives (ODDs), magneto-optical discs, magneto-optical drives, floppy diskettes, floppy disk drives (FDDs), magnetic tapes, solid-state drives (SSDs), RAM-drives, SECURE DIGITAL cards or drives, any other suitable computer-readable non-transitory storage media, or any suitable combination of two or more of these, where appropriate. A computer-readable non-transitory storage medium may be volatile, non-volatile, or a combination of volatile and non-volatile, where appropriate.

Herein, "or" is inclusive and not exclusive, unless expressly indicated otherwise or indicated otherwise by context. Therefore, herein, "A or B" means "A, B, or both," unless expressly indicated otherwise or indicated otherwise by context. Moreover, "and" is both joint and several, unless expressly indicated otherwise or indicated otherwise by context. Therefore, herein, "A and B" means "A and B, jointly or severally," unless expressly indicated otherwise or indicated otherwise by context.

The scope of this disclosure encompasses all changes, substitutions, variations, alterations, and modifications to the example embodiments described or illustrated herein that a person having ordinary skill in the art would comprehend. The scope of this disclosure is not limited to the example embodiments described or illustrated herein. Moreover, although this disclosure describes and illustrates respective embodiments herein as including particular components, elements, feature, functions, operations, or steps, any of these embodiments may include any combination or permutation of any of the components, elements, features, functions, operations, or steps described or illustrated anywhere herein that a person having ordinary skill in the art would comprehend. Furthermore, reference in the appended claims to an apparatus or system or a component of an apparatus or system being adapted to, arranged to, capable of, configured to, enabled to, operable to, or operative to perform a particular function encompasses that apparatus, system, component, whether or not it or that particular function is activated, turned on, or unlocked, as long as that apparatus, system, or component is so adapted, arranged, capable, configured, enabled, operable, or operative. Additionally, although this disclosure describes or illustrates particular embodiments as providing particular advantages, particular embodiments may provide none, some, or all of these advantages.

What is claimed is:

1. A receiver in a multicast network, the receiver comprising:
   one or more processors; and
   one or more computer-readable non-transitory storage media comprising instructions that, when executed by the one or more processors, cause one or more components of the receiver to perform operations comprising:
      transmitting an mtrace (*, G) route to a last hop router, wherein the last hop router is configured to forward the mtrace (*,G) route to a rendezvous point (RP);
      receiving an active source list generated by the RP that comprises one or more sources configured to transmit multicast traffic; and
      creating an mtrace (S,G) route for the RP to initiate based on the received active source list.

2. The receiver of claim 1, the operations further comprising generating a multicast distribution tree from the last hop router to the RP.

3. The receiver of claim 2, the operations further comprising updating the multicast distribution tree to include the mtrace (S,G) route from the RP to a source of the active source list.

4. The receiver of claim 1, the operations further comprising receiving a response signal from the RP comprising the mtrace (*,G) route.

5. The receiver of claim 1, the operations further comprising transmitting the mtrace (S,G) route to one of the one or more sources from the active source list.

6. The receiver of claim 5, wherein the one of the one or more sources receiving the mtrace (S,G) route is an any-source multicast source.

7. A method by a receiver for multicast mtrace extension to trace one or more any-source multicast (ASM) sources, comprising:
   transmitting an mtrace (*,G) route to a last hop router, wherein the last hop router is configured to forward the mtrace (*,G) route to a rendezvous point (RP);
   receiving an active source list generated by the RP that comprises one or more sources configured to transmit multicast traffic; and
   creating an mtrace (S,G) route for the RP to initiate based on the received active source list.

8. The method of claim 7, further comprising generating a multicast distribution tree from the last hop router to the RP.

9. The method of claim 8, further comprising updating the multicast distribution tree to include the mtrace (S,G) route from the RP to a source of the active source list.

10. The method of claim 7, further comprising receiving a response signal from the RP comprising the mtrace (*,G) route.

11. The method of claim 7, further comprising transmitting the mtrace (S,G) route to one of the one or more sources from the active source list.

12. The method of claim 11, wherein the one of the one or more sources receiving the mtrace (S,G) route is an any-source multicast source.

13. A non-transitory computer-readable medium comprising instructions that are configured, when executed by a processor, to:
   transmit an mtrace (*,G) route to a last hop router, wherein the last hop router is configured to forward the mtrace (*,G) route to a rendezvous point (RP);
   receive an active source list generated by the RP that comprises one or more sources configured to transmit multicast traffic; and
   create an mtrace (S,G) route for the RP to initiate based on the received active source list.

14. The non-transitory computer-readable medium of claim 13, wherein the instructions are further configured to:
   generate a multicast distribution tree from the last hop router to the RP; and
   update the multicast distribution tree to include the mtrace (S,G) route from the RP to a source of the active source list.

15. The non-transitory computer-readable medium of claim 13, wherein the instructions are further configured to:
   receive a response signal from the RP comprising the mtrace (*,G) route.

16. The non-transitory computer-readable medium of claim 13, wherein the instructions are further configured to:
   transmit the mtrace (S,G) route to one of the one or more sources from the active source list.

17. The non-transitory computer-readable medium of claim 16, wherein the one of the one or more sources receiving the mtrace (S,G) route is an any-source multicast source.

* * * * *